United States Patent
Goff

(10) Patent No.: US 7,840,826 B2
(45) Date of Patent: Nov. 23, 2010

(54) METHOD AND APPARATUS FOR USING PORT COMMUNICATIONS TO SWITCH PROCESSOR MODES

(75) Inventor: Lonnie C. Goff, Tempe, AZ (US)

(73) Assignee: VNS Portfolio LLC, Cupertino, CA (US)

( * ) Notice: Subject to any disclaimer, the term of this patent is extended or adjusted under 35 U.S.C. 154(b) by 673 days.

(21) Appl. No.: 11/809,197

(22) Filed: May 31, 2007

(65) Prior Publication Data

US 2008/0301482 A1 Dec. 4, 2008

(51) Int. Cl.
*G06F 1/26* (2006.01)
(52) U.S. Cl. .................. 713/323; 713/300; 713/320
(58) Field of Classification Search ............... 713/323, 713/300, 320; 712/20
See application file for complete search history.

(56) References Cited

U.S. PATENT DOCUMENTS

| | | | | |
|---|---|---|---|---|
| 5,251,299 | A * | 10/1993 | Masuda et al. | 714/10 |
| 5,367,636 | A * | 11/1994 | Colley et al. | 709/245 |
| 5,475,856 | A | 12/1995 | Kogge | |
| 6,898,721 | B2 | 5/2005 | Schmidt | |
| 7,496,915 | B2 * | 2/2009 | Armstrong et al. | 718/100 |
| 2002/0004912 | A1 | 1/2002 | Fung | |
| 2004/0107374 | A1* | 6/2004 | Cooper et al. | 713/320 |
| 2005/0228904 | A1 | 10/2005 | Moore | |
| 2005/0262278 | A1 | 11/2005 | Schmidt | |
| 2007/0192504 | A1 | 8/2007 | Moore | |
| 2007/0192570 | A1 | 8/2007 | Moore | |
| 2008/0123534 | A1* | 5/2008 | Gous | 370/238 |

FOREIGN PATENT DOCUMENTS

WO    WO 03/050697 A1    6/2003

OTHER PUBLICATIONS

"Embedded Arrays Venture Forth, IntellaSys 24-Core SEAforth Chips Target Low-Power Multimedia"; Bailey, Chris; Microprocessor Report, Microdesign Resources; Mountain View, CA; vol. 20, No. 8; Aug. 1, 2006, pp. 16-20.

"Ambric's New Parallel Processor; Globally Asynchronous Architecture Eases Parallel Programming"; Halfhill, Tom R.; Microprocessor Report; Scottsdale, AZ; Oct. 10, 2006; pp. 1-9.

(Continued)

*Primary Examiner*—Nitin C Patel
(74) *Attorney, Agent, or Firm*—Henneman & Associates, PLC; Larry E. Henneman, Jr.

(57) ABSTRACT

A computer array 100 including a field of processors 101-124 each processor having a separate memory. The processors 101-124 are connected to their immediate neighbors with links 200. Several configurations of the links are described including differing types of data lines 210 and control lines 215. Along lines 215 Process Command Words (PCW) to initiate processing tasks and Routing Connection Words (RCW) to initiate routing tasks pass between the processors 101-124 to provide a method for altering the mode of hybrid processors 107-118 in the array.

31 Claims, 6 Drawing Sheets

OTHER PUBLICATIONS

"The Raw Microprocessor: A Computational Fabric for Software Circuits and General-Purpose Programs"; Agarwal, A. et al.; IEEE Micro, IEEE Service Center, Los Alamitos, CA; vol. 22, No. 2; Mar. 1, 2002; pp. 25-35.

"iWarp: A 100-MPOS, LIW Microprocessor for Multicomputers"; Peterson, C. et al.; IEEE Micro, IEEE Service Center, Los Alamitos, CA; vol. 11, No. 3; Jun. 1, 1991, pp. 26-29 and 81-87.

"Communication Services for Networks on Chip"; Radulescu, A. et al.; Proceedings of the International Workshop on Systems, Architectures, Modeling and Simulation; Samos; vol. 2; Jan. 1, 2002; pp. 287-299.

PCT App. No. PCT/US2008/006794, International Search Report and Written Opinion dated Dec. 26, 2008.

EP App. No. 08251682.4-2211, Extended European Search Report dated Aug. 5, 2008.

* cited by examiner

FIG. 2 v2

| bit pos. | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| PCW | 0 | 0 | 0 | 0 | 0 | 0 | 0 | 0 | 0 | 0 | 0 | 0 | 0 | 0 | 0 | 0 | 0 | 0 |

| bit pos. | 17 | 16 15 | 14 13 12 11 10 9 8 | 7 6 5 4 3 2 1 0 |
|---|---|---|---|---|
| fields | RW | SA | X | CW |
| fields-X | | | B  A    CA | |
| RCW-1 | 1 | 0 0 | 0  0  0 0 1 0 1 | 0 0 0 0 0 1 1 1 |
| RCW-2 | 1 | 0 0 | 0  1  0 0 1 0 1 | 0 0 0 0 0 0 0 1 |
| RCW-3 | 1 | 0 0 | 1  0  0 0 1 0 1 | 0 0 0 0 0 1 1 0 |
| RCW-4 | 0 | 0 0 | 0  0  0 0 1 0 1 | 0 0 0 0 0 1 0 0 |
| RCW-5 | 0 | 0 0 | 0  1  0 0 1 0 1 | 1 1 1 1 1 1 1 1 |
| RCW-6 | 0 | 0 0 | 1  0  0 0 1 0 1 | 0 0 0 0 0 0 1 0 |
| RCW-7 | 0 | 0 1 | 0 0 1 0 1 | 1 0 0 0 0 0 0 0 |

FIG. 4

METHOD AND APPARATUS FOR USING PORT COMMUNICATIONS TO SWITCH PROCESSOR MODES

BACKGROUND OF THE INVENTION

1. Field of Invention

The present invention relates to the field of computers and computer processors, and more particularly to a method and apparatus for connecting computers together. The predominant current usage of the present invention's direct execution method and apparatus is in the combination of multiple computers on a single microchip, where operating efficiency is important not only because of the desire for increased operating speed but also because of the power savings and heat reduction that are a consequence of the greater efficiency.

2. Description of the Background Art

It is useful in many information processing applications of computers to use multiple processors or multiple computers to speed up operations. Dividing a task and performing multiple processing and computing operations in parallel at the same time is known in the art, as are many systems and structures to accomplish this. An example is systolic array processing wherein a large information stream is divided up among rows of processors that perform sequential computations by column, and pass results to the next column. Other examples are found in the field of supercomputing, wherein multiple processors may be interconnected and tasks assigned to them in a number of different ways, and communication of intermediate results between processors and new data and instructions to them may be provided through crossbar switches, bus interconnection networks with or without routers, or direct interconnections between processors with message passing protocols such as MPICH, used on large machines.

Owing to continual progress in semiconductor technology, more and faster circuits can be placed on a microchip area. Single chip multiprocessor arrays and multicore processors that provide new capabilities and optimizations as embedded systems in consumer and industrial electronic products, by doing computations enormously faster, are examples of improvements which have yielded great economic benefit. Thus further improvement of multiple processors and their interconnections, especially on a single microchip, is highly desirable.

SUMMARY OF INVENTION

It is anticipated that the multiprocessor array and method of the invention will be principally, but not necessarily exclusively, used in a large class of applications wherein the multiprocessor array is adapted to operate as a plurality of von Neumann machines with local memories which hold substantially the major part of its program instructions, in particular the operating system.

The invention includes a number of computer arrays, each including a field of processors and each processor including separate memory. The processors are connected to their immediate neighbors with links. Several configurations of the links are described including differing types of data lines and control lines. Along these lines Process Command Words (PCW) and Routing Connection Words (RCW) pass between the processors to provide a method for altering the mode of at least several of the processors in the array.

The utilization of this method assures a more efficient allocation of computing resources while minimizing power consumption. The method further allows efficient allocation of computing resources and connection to resources outside of the array such as external memory and peripheral devices.

BRIEF DESCRIPTION OF THE FIGURES

In the accompanying drawings:

FIG. 2 shows in greater detail a first embodiment of the interconnecting link 200 between processors;

FIG. 4 illustrates a Routing Connection Word (RCW) and examples for external RAM operations.

DETAILED DESCRIPTION

Figure 1:
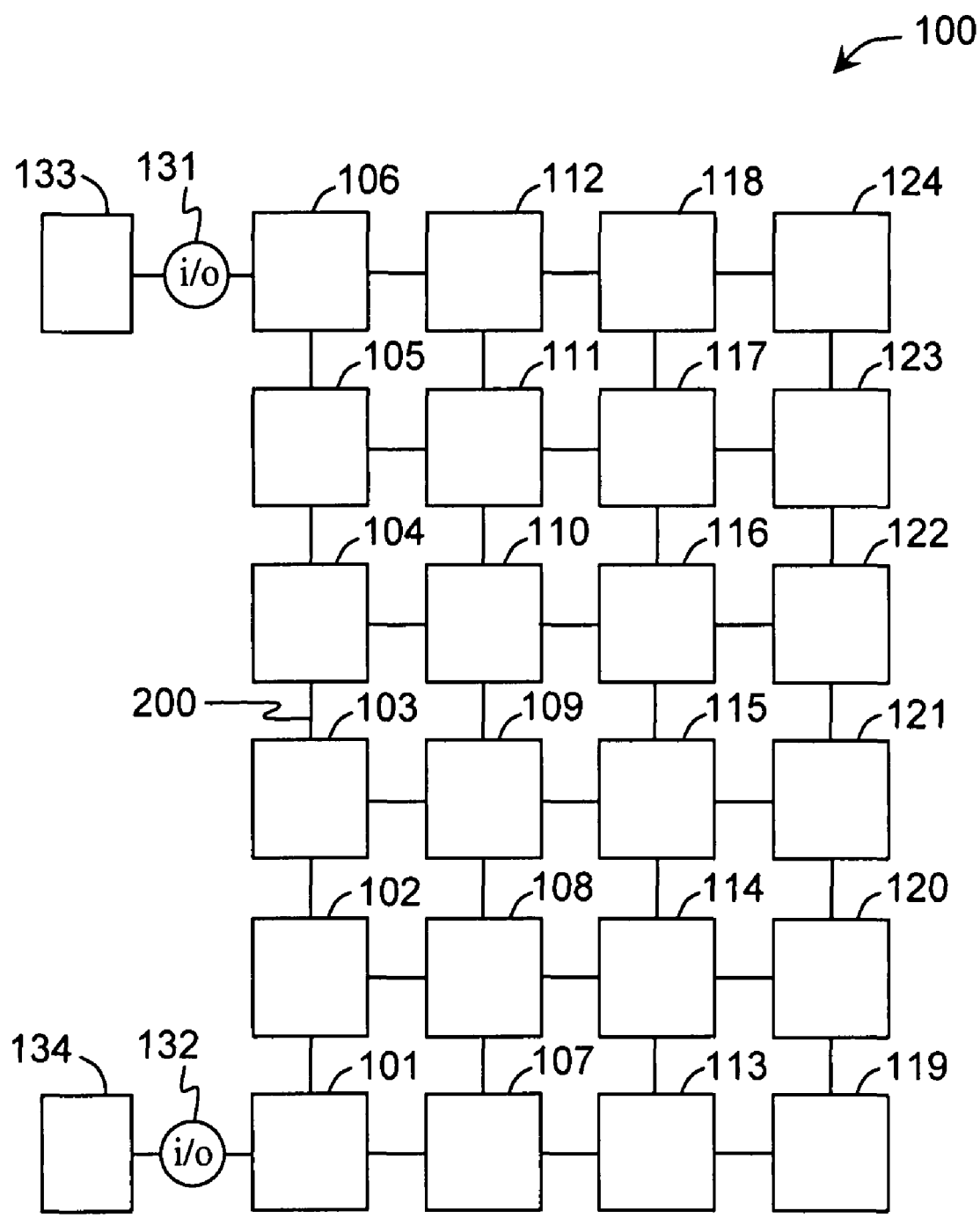
FIG. 1 is a symbolic diagram of a 24-processor array 100 according to an embodiment of the invention.

FIG. 1 depicts a multiprocessor array 100 comprising twenty-four processors 101-124 disposed in a 4 by 6 array that can be on one microchip. It will be apparent to those skilled in the art that other numbers and disposition of processors are alternatively possible within the scope of the invention. In an illustrative example, each processor could have a word size of 18 bits, and a local memory including 512 words of RAM and 512 words of ROM. These parameters are not limitations on the invention and operation is possible with any amount of memory sufficient to allow operation of the devices. This particular processor, listed for illustrative purposes, only utilizes a 32-instruction RISC version of the Forth computer language as machine language. It is realized that the invention could be practiced with any suitable machine language including C compiled into binary form with a suitable processor. Each of processors 101, 102, 103-124 is connected to their nearest neighbor by interconnecting links 200 as shown in FIG. 1. Processors 108-111 and 114-117 in the middle of the array have four such interconnecting links 200.

Corner processors 101, 106, 119 and 124 have only two connecting links 200. In this illustrative example corner processors 101 and 106 have their west ports connected to input/output ports 131 and 132 respectively. External input-output (i/o) connections 131 and 132 to the array are for the general purpose of communicating with external devices 133 and 134. External input and output is for data and some instructions. These instructions and data are shared by the processors of the array, and operate generally by individual control of the processors, as will be further described hereinbelow. Processors other than 101 and 106 of the array communicate by routing of information through intermediate processors and their interconnecting links 200. Serving of information between external devices 133 and 134 and other processors of the array is a primary task of processors 101 and 106. Processors 101 and 106 are thus considered to be server processors. Ports 131 and 132 may be connected to external devices 133 and 134 which may be selected from sensors, external memory devices, display devices input devices or any device typically connected to a processor. In such an embodiment of the invention said i/o connections can be implemented by control, data, and address lines to port 131 from processor 106 to an external memory device 133, and can be in accordance with a known standard and by enable, clock, data-in, and data-out lines through port 132 connecting processor 101 to an external serial peripheral interface (SPI) device 134, as known in the art. It will be apparent to those skilled in the art that in alternate embodiments, there can be just one, or alternatively more than two, external i/o devices and connections provided through a corresponding number of server processors. According to the invention, said external devices can be disposed on the same microchip as the multiprocessor array, and they can alternatively comprise any combination of memory and data communication interface devices; and in further embodiments, more than one multiprocessor array, and any additional circuits as may be required by the application, can be disposed on one microchip.

Processors 102-105, 107, 112, 113, 118 and 120-123 on the edge each have three connecting links 200. Multiprocessor array 100 is adapted to perform computations mainly with these processors at the periphery of the array when the information processing requirements of the current application are slow, in particular, with processors 102-105 and 119-124. Processors 102-105 and 119-124 can also be termed client processors. In other applications processors 102-105 and 119-124 may also act as input/output processors by functioning as active ports including analog to digital converters, fast Fourier transforms and digital to analog conversion with suitable ports (not shown).

Processors 107-118, the two inner columns of the array are adapted to be hybrid processors, which at a given point in time are either routing information to another processor of the array, herein referred to as R-mode; or performing computations and information processing tasks, herein referred to as P-mode; or waiting in an idle, standby condition herein referred to as I-mode. I-mode is a default condition of low operating power, to which a hybrid processor automatically returns after completing an operation or sequence of operations in the other two modes, and it is a power-saving feature especially useful in battery-powered system applications. At slow conditions hybrid processors 107-118 are generally in I-mode, and switch to R-mode from time to time, when input and output operations are required by client processors 102-105 and 119-124. Hybrid processors 107-118 are adapted to switch to R-mode in response to assertion of a Routing Connection Word (RCW) on the plurality of data lines 200 of any one of the interconnecting links. Routing connection paths to and from each client processor and server processor are predetermined in firmware stored in memory, at compile time, during manufacture, or later reconfiguration of the array, using known techniques.

FIG. 2 shows in greater detail link 200 between processors 103 and 104 each link 200 is a plurality of interconnecting lines, sometimes called a one drop bus net in the art. In this example each link 200 includes a plurality of 18 data lines 210 and 2 control lines 215 adapted to operate bi-directionally and asynchronously. Hybrid processors 107-118 are adapted to switch to R-mode in response to assertion of a Routing Connection Word (RCW) on the plurality of data lines 210 of any one of its interconnecting links with other processors, subject to appropriate signals on the respective control lines 215. According to a second embodiment, plurality 200 can comprise 36 data and 4 control lines adapted to operate synchronously and unidirectionally, half of the lines in one, and half in the opposite direction. In yet other embodiments of the invention, different common processor characteristics including word size, memory size, computer language, and number of interconnecting lines can be employed. A line is herein understood to be an electrically conductive trace on the surface of a microchip comprising one or more strips of conductive material alternating with vias and electrically in series, which can be disposed in the same and different layers of a multilayer microchip. It is further anticipated according to the invention that said processors and links can alternatively be implemented in technologies other than semiconductor integrated circuits, for example in integrated optics or in molecular and chemical information processors, with appropriate modifications made according to the art.

Figure 3:
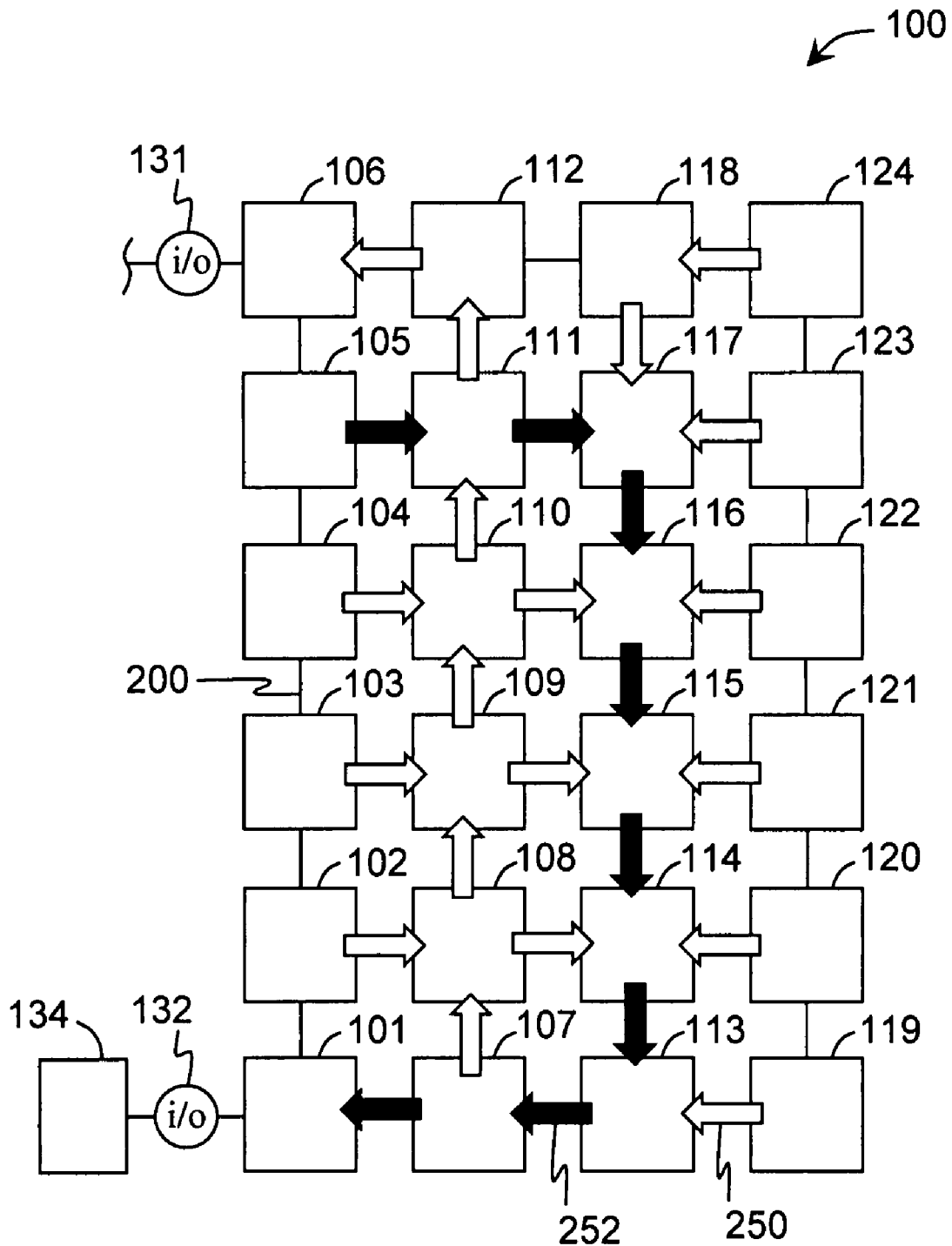
FIG. 3 is a symbolic diagram showing predetermined routing paths of the multiprocessor array 100.

FIG. 3 shows a set of predetermined paths for array 100, by hollow arrows 250 and black arrows 252 indicating the direction of write instructions from client processors 102-105 and 119-124 to server processors 101 and 106. For read instructions, the routing paths will be first in the given direction to pass the command, and then in the reverse direction to pass the information back. As a particular example, the routing path for a write operation by processor 105 to memory device 320 over i/o connection 132 and server 101 can be predetermined to proceed through hybrid processors 111, 117, 116, 115, 114, 113 and 107 which will be operating in R-mode during the information transfer, and this path is indicated by black arrows 252.

FIG. 4 shows a format of the RCW employed wherein each row displays a representation of the RCW, as labeled or designated in the leftmost column. The bit positions of a processor word are given in the top row of FIG. 4 and the information fields of the RCW represented by the bits are noted in the second row. Each bit position corresponds to a particular, bi-directionally and asynchronously operating data line of the plurality 210, in the first embodiment described hereinabove with reference to FIG. 2, as known in the art, and to a particular pair of unidirectionally and synchronously operating data lines of the plurality 210, in the second embodiment. In particular, the lowest eight bits (bit positions 0 to 7) contain the word count (CW) of information to be routed; the top bit (bit 17) is a read or write designator RW specifying the direction of the information transfer, for example 1 for read and 0 for a write operation to an external device; bits 15 and 16 hold the server address (SA), which in this embodiment can be 00 or 01 identifying server processors 101 or 106; and bits 8 through 14 can contain application-specific information X, which will be described in more detail with reference to the third and subsequent rows of FIG. 4, hereinbelow. One of hybrid processors 111, 117, 116, 115, 114, 113 and 107 which receives an RCW, by having this RCW asserted on one of its interconnecting links, retains a copy of the RCW and passes it on, unmodified, to the next processor along the predetermined path to the server processors 101 and 106 identified by SA. In case of a write, the CW words of information to be routed can immediately follow the RCW; and in case of a read, CW words of information can be returned in the opposite direction along the same predetermined path, after the RCW reaches server processors 101 and 106 and associated external devices 131 and 133. Hybrid processors 111, 117, 116, 115, 114, 113 and 107 are adapted to revert to I-mode automatically after the number of words specified by CW has been routed.

The field X can be partitioned into subfields as shown in the third row of FIG. 4, designating bits 8-12 for a client processor address CA, and bits 13 and 14 for switch instructions A and B, to specify either the private block (bit value 1) or the shared region of memory (bit value 0).

Figure 5:
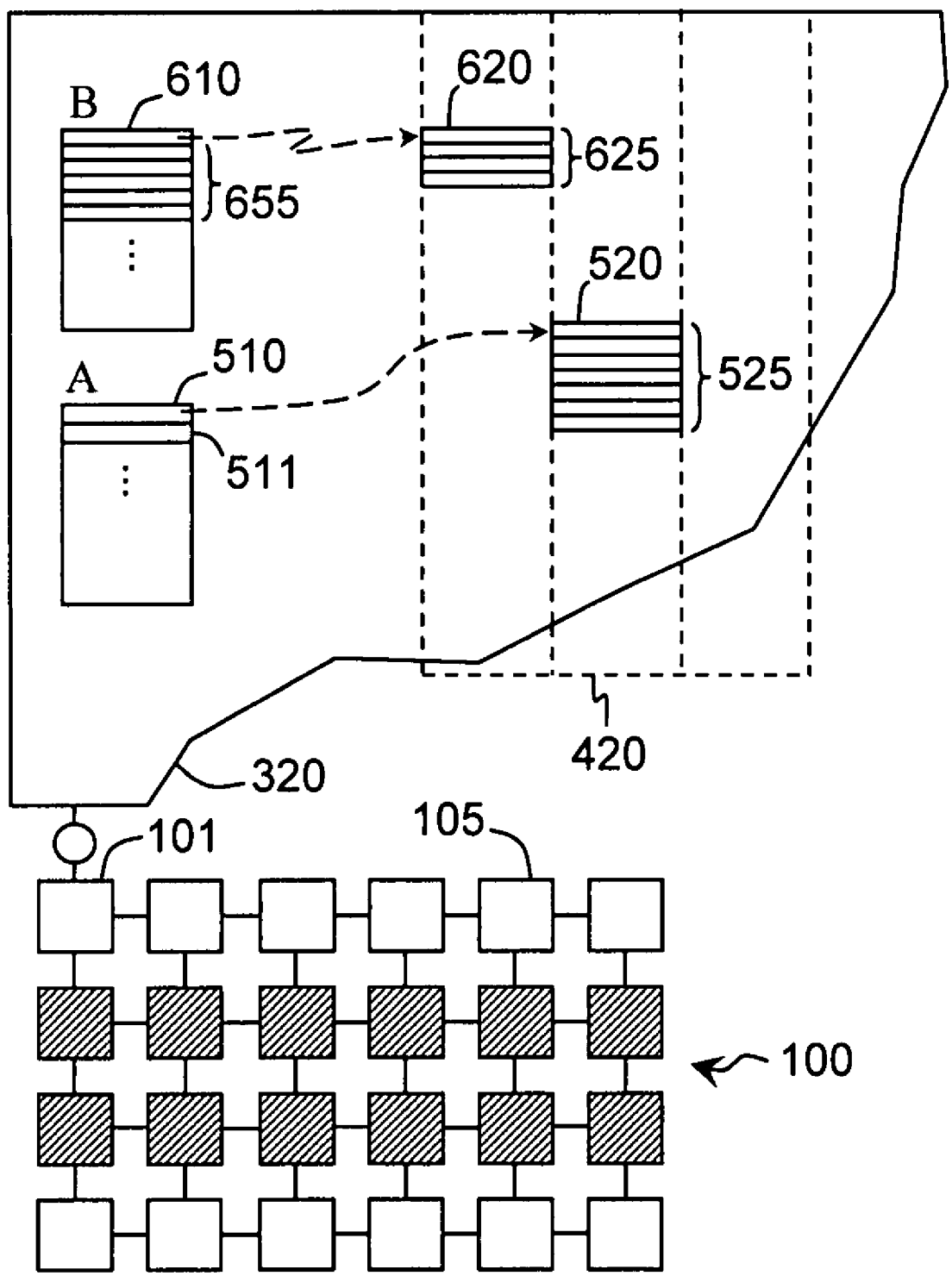
FIG. 5 shows an expanded partial view of an external memory device 320 connected to multiprocessor array 100, showing in diagrammatic form sections of memory used by a processor of the array.

FIG. 5 is a diagram of external RAM device 133 of the multiprocessor array 100. Several sections of the memory can be identified. The application-specific information field X of the RCW can be used to communicate with an external RAM device 133 that is shared by the client processors of the array. The external RAM can have two private information blocks for each client processor, called Block A and Block B and a general, shared region 420 of memory indicated by rows of dashed lines in the figure. Block A can be used for read control, to specify addresses in the general region of RAM from which information will be read, and Block B, for write control, to specify addresses in said general region to which information will be written. In particular, the private blocks can hold the start address for the next access to the general region of RAM for each client processor, and said blocks can be automatically incremented by the server processor, at each access.

Examples of RCWs, labeled RCW-1 through RCW-6, for several different external RAM operations that can be performed by a client processor are shown in other rows of FIG. 4 with reference to the memory blocks of FIG. 5 for each specific RCW. As described hereinabove, RW bit 17 can be 1 for a read and 0 for a write operation. For present purposes the address SA of server processor 101 which connects to external RAM device 133 can be 00, and the client processor can be processor 105 with CA address 00101. Although the inventive method is described herein with reference to particular embodiments and processors, it will be apparent to those skilled in the art that the described inventive use of RCWs will be equally effective also for other processors and embodiments, with appropriate modification of addresses and routing paths.

Routing Connection Word RCW-1 has 1 in the RW field designating a read operation, 0 in both switch fields A and B, and 00000111 in the CW field (CW=7), calling for 7 words of information to be read from an address in the shared region of RAM that is specified in the top memory location 510 of the private read control Block A for client processor 105. That address, for example, specifies memory location 520 as indicated by a dashed arrow in the figure, and thus RCW-1 calls for the contents of a 7-word block 525 of information in the shared region of external RAM to be read by (transferred to) client processor 105. The top of Block A increments to location 511 after this operation, and the next read operation by client processor 105 from the shared region of RAM will occur from the address specified in 511.

RCW-2 in FIG. 4 has 1 in the RW field, 1 in block switch field A, and CW=1, calling for one word of information to be read from the top of Block A, that is, from location 511, assuming RCW-2 follows RCW-1, and this can tell client processor 105 the address of its next read from the shared region of external RAM.

RCW-3 in the next row has again 1 in the RW field, 1 in block switch field B, and CW=6, calling for a 6-word block 655 of information to be read from the top of Block B, beginning with location 610, and this can tell the client processor the addresses of its next 6 write operations to the shared region.

RCW-4 in the following row has 0 in the RW field, 0 in both switch fields A and B, and CW=4, directing a 4-word block of information to be written (transferred from processor 105) to the shared memory region starting with the address specified in location 610 which is currently at the top of write control Block B. That address specifies memory location 620 as indicated by the dashed arrow in FIG. 5, and accordingly, the block 625 of 4 memory locations starting with 620 will be filled with new information from client processor 105.

RCW-5 has again 0 in the RW field, 1 in switch field A, and CW=255, calling for a 255-word block of information to be written to the read control Block A for processor 105 beginning with the current top location. This has the effect of updating the addresses of the next 255 read operations by 105 from the shared region.

RCW-6 has still 0 in the RW field, 1 in switch field B, and CW=2, calling for the top 2 locations of the write control Block B to be updated, for example to reverse the order for the next two write operations to the shared region, based on the information read by means of RCW-3.

RCW-7 in FIG. 4 shows how application-specific field X can also be used for external output or input by client processors to an external serial peripheral interface (SPI), which is shown and described hereinabove with reference to FIG. 1. RCW-7 in FIG. 4, provides an example of SPI communication, having 1 in the RW field; 01 in the SA field, for the address of the server processor connecting to the SPI; address 00101 of client processor 105 in the CA field; and CW=128, calling for input of the next 128 words of information such as data from the SPI to 105. Fields A and B are not used.

Figure 6:
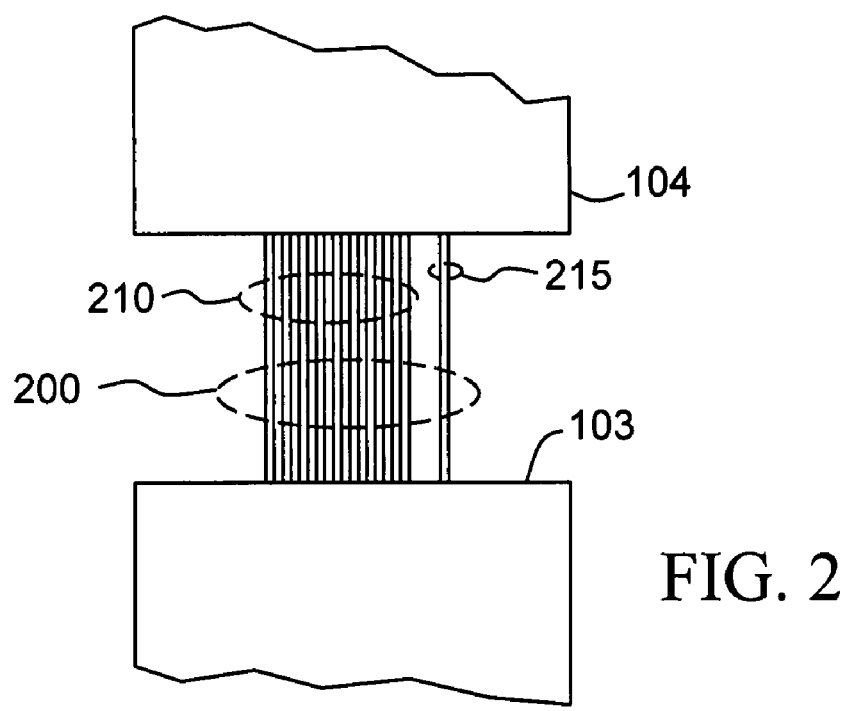
FIG. 6 shows the format of the Process Command Word (PCW)

FIG. 6 shows the format of the Process Command Word (PCW), comprising all zeros. At higher processing speeds required from the multiprocessor array, the hybrid processors are adapted to receive some of the computational load from their adjacent client processors, under control of the client processor. Each of the hybrid processors 111, 117, 116, 115, 114, 113 and 107 are adapted to switch to P-mode in response to assertion of a Process Command Word (PCW). The PCW is received upon the data lines 210 of the interconnecting link with its adjacent, nearest-neighbor client processor. The PCW is received while a given hybrid processor is in I-mode, subject to appropriate signals on the respective control lines 215. Once a PCW is received, such hybrid processor remains in P-mode until it completes its assigned processing task, and then reverts back to I-mode. The processing task is application dependent and is known by both the client processor selected from 101 and 106 and the adjacent hybrid processor, by having the instructions of the task in their respective memories; and any amount of information with any content can be exchanged between the processors while the hybrid processor is in P-mode.

The terms adjacent and nearest-neighbor should herein be understood not only with reference to physical location and space but also functionally, in alternate embodiments of the invention wherein processors may be functionally but not necessarily physically adjacent. It is apparent with reference to FIG. 3 that in the predetermined routing connection paths between client processors and server processors, the interconnecting links of hybrid processors with client processors are not shared and involve communication only between particular client and hybrid pairs. An interconnecting link can be private to a hybrid and client pair, and only the client processor adjacent to a hybrid processor can issue a PCW to that hybrid processor.

According to an embodiment of the invention, the P-mode can be adapted to be interrupted for routing operations through non-private, other interconnecting links of a hybrid processor, other than the interconnecting link with its adjacent client processor, with priority given to R-mode over P-mode whenever an RCW is asserted on a non-private interconnecting link of a hybrid processor. For example, with reference to FIG. 3, if hybrid processor 115 is in P-mode under control of adjacent client processor 121, and an RCW from client processor 105 appears on its interconnecting link with processor 116, it can switch to R-mode, and then back to P-mode after completion of the routing operation specified in the RCW.

Figure 7:
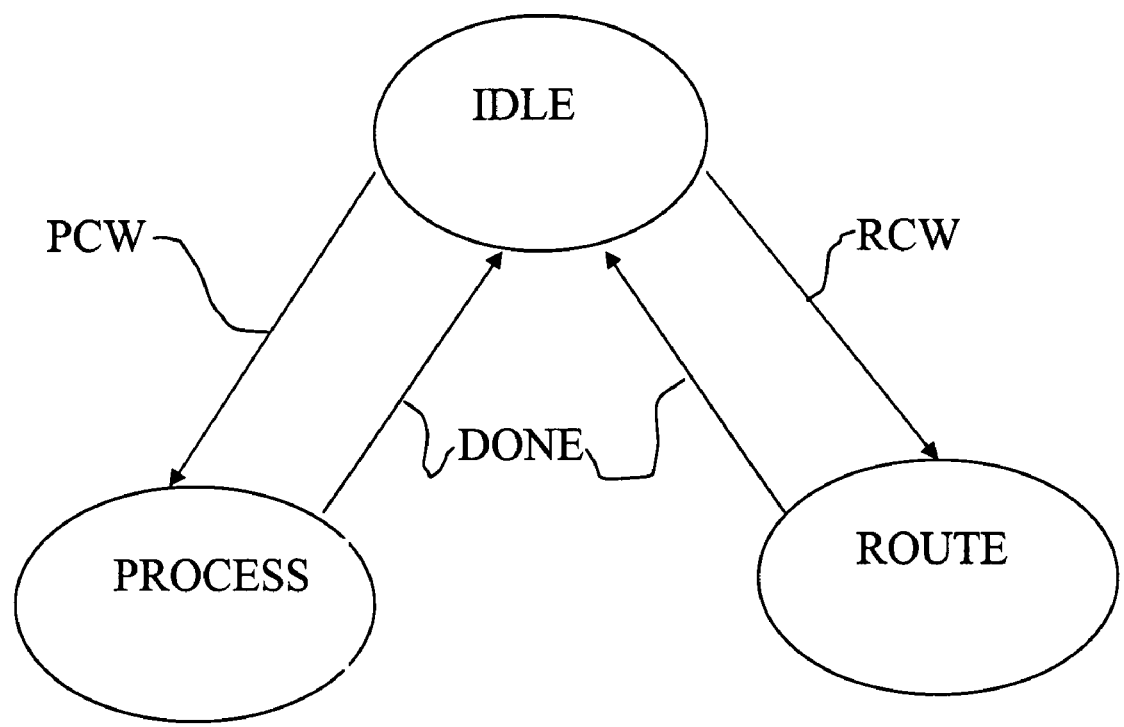
FIG. 7 is a chart of the method of the invention

FIG. 7 is a chart of the method of the invention. Hybrid processors 111, 117, 116, 115, 114, 113 and 107 operate in three distinct states. They are Idle Mode, Routing Mode and Processing Mode. In one embodiment only Client Processors 101 and 106 directly attached to the hybrid processors 107 and 102 respectively can cause a transition from Idle to Processing mode by issuing a Process Command Word. A Route Command Word appearing on any port, however, causes the transition from Idle to Routing mode. The transition from either Processing or Routing mode back to Idle mode is under the strict control of the hybrid processor.

According to the embodiments of the invention described hereinabove, a method using single words, RCW and PCW, enables communication between client processors and external memory devices or serial interfaces, and between client processor and hybrid processor pairs. It will be appreciated by those skilled in the art that in alternate embodiments a modified method using two consecutive combined routing and processing command words can enable communication between all processors of a multiprocessor array, with each other and with external devices and interfaces, and switching between R-mode and P-mode, with appropriate modification of the format to include the addresses of a sending and a receiving processor, a routing word count, and a processing word count. In still alternative embodiments, a combined routing and processing command can use a single word larger than 18 bits, or the combined command can comprise more than two words.

Various modifications may be made to the invention without altering its value or scope. For example, while this invention has been described herein using the example of the particular processors 101-124, many or all of the inventive aspects are readily adaptable to other computer designs, other sorts of computer arrays, and the like.

Similarly, while the present invention has been described primarily herein in relation to communications between Processors 101-124 in an array 100 on a single die, the same principles and methods can be used, or modified for use, to accomplish other inter-device communications, such as communications between processors 101-124 and external memory 131 or between processors 101-124 in an array 100 and an external device 133.

While specific examples of the inventive arrays 100, processors 101-124, and associated apparatus, and method have been discussed herein, it is expected that there will be a great many applications for these which have not yet been envisioned. Indeed, it is one of the advantages of the present invention that the inventive method and apparatus may be adapted to a great variety of uses.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive computer arrays 100, processors 101-124, links 200, data lines 210, control lines 215, Process Command Words (PCW), Routing Connection Words (RCW), and method are intended to be widely used in a great variety of computer applications. It is expected that they will be particularly useful in applications where significant computing power is required, and yet power consumption and heat production are important considerations.

As discussed previously herein, the applicability of the present invention is such that the sharing of information and resources between the computers in an array is greatly enhanced, both in speed a versatility. Also, communications between a computer array and other devices are enhanced according to the described method and means. Since the computer arrays 100, processors 101-124, links 200, data lines 210, control lines 215, Process Command Words (PCW), Routing Connection Words (RCW), and method of the present invention may be readily produced and integrated with existing tasks, input/output devices, and the like, and since the advantages as described herein are provided, it is expected that they will be readily accepted in the industry. For these and other reasons, it is expected that the utility and industrial applicability of the invention will be both significant in scope and long-lasting in duration.

The invention claimed is:

1. A computer array comprising:
    a plurality of processors; and wherein
    each processor is connected to at least two adjoining processors by a plurality of links, each said link being connected to only two of said processors;
    said plurality of processors includes
        a plurality of edge processors located at the edge of said array, each said edge processor having three links connecting said edge processor to three adjacent processors,
        four corner processors, each said corner processor located at a corner of said array and having two of said links connecting said corner processor to two of said edge processors, and
        a plurality of hybrid processors, each of said hybrid processors connected by four links to four processors, the link of said edge processor not connected to another one of said edge processors or one of said corner processors being connected to a single said hybrid processor;
    said hybrid processors selectively switch between a rest mode, a routing mode, and a processing mode; and
    when one of said hybrid processors receives an instruction on one of said links connected to said one of said hybrid processors, said one of said hybrid processors switches between said rest mode and at least one of said routing mode and said processing mode.

2. A computer array as in claim 1, wherein said link includes a plurality of data lines.

3. A computer array as in claim 2, wherein said link further includes a plurality of control lines.

4. A computer array as in claim 3, wherein said control lines are unidirectional.

5. A computer array as in claim 1, wherein at least one of said corner processors of said array includes an interface to couple said at least one corner processor to an external device selected from the group of memory, input devices, display devices and processing devices.

6. A computer array as in claim 1, wherein at least one of said edge processors of said array includes an interface to couple said at least one edge processor to an external device selected from the group of memory, input devices, display devices and processing devices.

7. A computer array as in claim 1, wherein:
    each of said links includes a data line and a control line; and
    said instruction is a digital word passed over said data line.

8. A computer array as in claim 7, wherein said digital word is a routing word that causes said one of said hybrid processors to switch into said routing mode.

9. A computer array as in claim 7, wherein said digital word is a processing word that causes said one of said hybrid processors to switch into said processing mode.

10. A computer array as in claim 1, wherein:
    when, prior to completing a processing task in said processing mode, said one of said hybrid processors receives a subsequent instruction associated with a routing task on one of said links connected to said one of said hybrid processors, said one of said hybrid processors switches from said processing mode to said routing mode to perform said routing task;

said one of said hybrid processors switches back to said processing mode following completion of said routing task to continue said processing task; and said one of said hybrid processor switches to said rest mode following completion of said processing task.

11. A computer array as in claim 1, wherein:

when said instruction has a processing format, said one of said hybrid processors switches into said processing mode; and when said instruction has a routing format, said one of said hybrid processors switches into said routing mode.

12. A computer array as in claim 11, wherein:

said instruction includes a plurality of bits;

said instruction has said processing format when each bit in said instruction has the same value; and said instruction has said routing format when at least two of said bits in said instruction have different values.

13. A computer array as in claims 11, wherein:

said routing format includes a plurality of information fields;

a first information field indicates the amount of data to be routed; and a second information field contains information specific to an external device.

14. A processor for use in a computer array, said processor comprising:

a central processing unit coupled to at least two links, each of said links connecting said processor to an immediately adjacent processor; and a memory unit connected to said central processing unit; and wherein said central processing unit has three modes including an idle mode for conserving power, a routing mode for performing routing tasks, and a processing mode for performing processing tasks; and receipt of an instruction on either of said links causes said central processing unit to shift from said idle mode to at least one of said routing mode and said processing mode.

15. A processor for use in a computer array as in claim 14, wherein said central processing unit is coupled to at least two additional links for connecting said processor to two additional immediately adjacent processors for a total of four links for connecting to four immediately adjacent processors.

16. A processor for use in a computer array as in claim 15, wherein said memory unit includes a ROM memory and a RAM memory.

17. A processor for use in a computer array as in claim 15, wherein:

each of said links includes a data line and a control line; and said instruction is a digital word passed over said data line.

18. A processor for use in a computer array as in claim 17, wherein said control line is unidirectional.

19. A processor for use in a computer array as in claim 14, wherein said central processing unit shifts from said idle mode to said routing mode upon receipt of a routing connection word and stays in said routing mode until said routing task is completed, and, then returns to said idle mode.

20. A processor for use in a computer array as in claim 14, wherein said central processing unit shifts from said idle mode to said processing mode upon receipt of a processing command word, and, stays in said processing mode until said processing task is completed, and, then returns to said idle mode.

21. A processor for use in a computer array as in claim 20, wherein said central processing unit shifts from said idle mode to said routing mode upon receipt of a routing connection word, and, stays in said routing mode until said routing task is completed, and, then returns to said idle mode.

22. A processor for use in a computer array as in claim 14, wherein:

when said central processing unit is in said processing mode and prior to completion of a processing task, receipt of a subsequent instruction associated with a routing task on either of said links causes said central processing unit to shift from said processing mode to said routing mode to perform said routing task;

said central processing unit shifts back to said processing mode following completion of said subsequent routing task to continue said processing task; and said central processing unit shifts to said rest mode following completion of said processing task.

23. A processor for use in a computer array as in claim 14, wherein:

when said instruction has a processing format, said central processing unit shifts into said processing mode; and when said instruction has a routing format, said central processing unit shifts into said routing mode.

24. A processor for use in a computer array as in claim 23, wherein:

said instruction includes a plurality of bits;

said instruction has said processing format when each bit in said instruction has the same value; and said instruction has said routing format when at least two of said bits in said instruction have different values.

25. A processor for use in a computer array as in claims 23, wherein:

said routing format includes a plurality of information fields;

a first information field indicates the amount of data to be routed; and a second information field contains information specific to an external device.

26. A method for operating a multi processor array, said method comprising:

designating some of the processors in said array as multimode processors having at least an idle mode for conserving power, a routing mode for performing a routing task, and a processing mode performing a processing task;

switching one of said multimode processors from said idle mode into at least one of said processing mode and said routing mode upon receipt of a command word with said one of said multimode processors;

performing one of said routing task and said processing task with said one of said multimode processors upon receipt of said command word; and switching said one of said multimode processors back to said idle mode upon completion of said performed task.

27. A method for operating a multi processor array as in claim 26, wherein:

said command word defines a routing word indicative of said routing task;

said one of said multimode processors switches into said routing mode upon receipt of said routing word;

said one of said multimode processors performs said routing task; and said one of said multimode processor returns to said idle mode upon completion of said routing task.

28. A method for operating a multi processor array as in claim 26, further comprising:

switching said one of said multimode processors from said idle mode into said processing mode to perform said processing task upon receipt of said command word;

switching said one of said multimode processors from said processing mode into said routing mode prior to completing said processing task, said switching to said routing mode occurring responsive to said one of said multimode processors receiving a subsequent command word associated with a subsequent routing task;

performing said subsequent routing task with said one of said multimode processors;

switching said one of said multimode processors back to said processing mode following completion of said subsequent routing task;

completing said processing task with said one of said multimode processors; and switching said one of said multimode processors into said idle mode upon completion of said processing task.

29. A method for operating a multi-processor array as in claim 26, wherein:

said one of said multimode processors switches into said processing mode when said command word has a processing format; and said one of said multimode processors switches into said routing mode when said command word has a routing format.

30. A method for operating a multi processor array as in claim 29, wherein:

said command word includes a plurality of bits;

said command word has said processing format when each bit in said command word has the same value; and said command word has said routing format when at least two of said bits in said command word have different values.

31. A method for operating a multi processor array as in claims 29, wherein:

said routing format includes a plurality of information fields;

a first information field indicates the amount of data to be routed; and a second information field contains information specific to an external device.

* * * * *